United States Patent
Voss et al.

(10) Patent No.: US 10,378,668 B2
(45) Date of Patent: Aug. 13, 2019

(54) VALVE SEAT SUPPORT

(71) Applicant: Continental Teves AG & Co. oHG, Frankfurt (DE)

(72) Inventors: Christoph Voss, Frankfurt (DE); Christian Schulz, Riedstadt (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 15/644,233

(22) Filed: Jul. 7, 2017

(65) Prior Publication Data

US 2017/0307099 A1 Oct. 26, 2017

Related U.S. Application Data

(63) Continuation of application No. PCT/EP2015/079338, filed on Dec. 11, 2015.

(30) Foreign Application Priority Data

Jan. 7, 2015 (DE) ........................ 10 2015 200 072

(51) Int. Cl.
*F16K 25/00* (2006.01)
*F16K 1/42* (2006.01)
(Continued)

(52) U.S. Cl.
CPC ...... *F16K 25/005* (2013.01); *B29C 45/14311* (2013.01); *B60T 8/3615* (2013.01); *F16K 1/427* (2013.01); *F16K 31/0655* (2013.01); *F16K 31/0675* (2013.01); *B29C 2045/14237* (2013.01); *B29L 2031/7506* (2013.01); *B60T 8/363* (2013.01)

(58) Field of Classification Search
CPC ............... F16K 25/005; F16K 31/0675; F16K 31/0655; F16K 1/427; F16K 1/42; F16K 27/02; F16K 11/07; F16K 3/24; F16K 3/30; F16K 31/06; B29C 45/14311; B29C 2045/14237; B60T 8/3615; B60T 8/363; B29L 2031/7506
USPC .................................................. 251/360–365
See application file for complete search history.

(56) References Cited

U.S. PATENT DOCUMENTS 8,733,397 B2 * 5/2014 Otsuka ................... B60T 8/363
137/630.16

FOREIGN PATENT DOCUMENTS

| CN | 1991220 A | 7/2007 |
| CN | 102235514 A | 11/2011 |

(Continued)

OTHER PUBLICATIONS

German Search Report dated Sep. 14, 2015 for corresponding German Patent Application No. 10 2015 200 072.9.
(Continued)

*Primary Examiner* — Craig J Price
*Assistant Examiner* — Andrew J Rost

(57) ABSTRACT

A valve seat support for a solenoid valve consists of a sleeve-shaped support housing for accommodating a valve seat body, which is produced from a plastic and which has the contour of a hollow cylinder. The support housing has, on the periphery thereof, a plurality of small-surface recesses, which are directly radially inward and which are surrounded by the plastic of the valve seat body on all sides in order to establish an interlocking connection between the support housing and the valve seat body.

11 Claims, 3 Drawing Sheets

(51) Int. Cl.
*F16K 31/06* (2006.01)
*B60T 8/36* (2006.01)
*B29C 45/14* (2006.01)
*B29L 31/00* (2006.01)

(56) References Cited

FOREIGN PATENT DOCUMENTS

| | | | |
|---|---|---|---|
| CN | 103562028 | A | 2/2014 |
| DE | 3024435 | A1 | 1/1982 |
| DE | 4211307 | A1 | 10/1993 |
| DE | 4443287 | A1 | 6/1996 |
| DE | 19529724 | A1 | 2/1997 |
| DE | 19710541 | A1 | 9/1998 |
| DE | 19739886 | A1 | 3/1999 |
| DE | 102009003227 | A1 | 11/2010 |
| EP | 1737715 | A1 | 1/2007 |
| WO | 9715771 | A1 | 5/1997 |
| WO | 0074988 | A1 | 12/2000 |
| WO | 2005102807 | A1 | 11/2005 |
| WO | 2008050227 | A2 | 5/2008 |

OTHER PUBLICATIONS

International Search Report and Written Opinion dated Sep. 3, 2016 from corresponding International Patent Application No. PCT/EPPCT/EP2015/079338.

\* cited by examiner

VALVE SEAT SUPPORT

CROSS-REFERENCE TO RELATED APPLICATION

This application claims the benefit of PCT International application No. PCT/EP2015/079338, filed Dec. 12, 2015, which claims priority to German patent application No. 10 2015 200 072.9, filed Jan. 1, 2015, each of which is hereby incorporated by reference herein.

TECHNICAL FIELD

The invention concerns a valve seat support, in particular for a solenoid valve.

BACKGROUND

EP 1 737 715 B1 has already disclosed a valve seat support fixed to a solenoid valve and comprising a sleeve-shaped support housing containing a valve seat body which is made of a plastic and has the contour of a hollow cylinder. To fix the valve seat body to the support housing, the lower sleeve portion is angled radially inward into a flange which is embedded in the plastic of the valve seat body on both sides.

The proposed fixing of the valve seat body to the support housing however requires additional material to produce the angled flange, and has not proved particularly advantageous in relation to the embedding of the flange in the plastic of the valve seat body on both sides.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Therefore, a low-cost and compact valve seat support of the type described, as simple as possible and suitable for function, in which the valve seat body is securely fixed to the support housing with minimum complexity.

A valve seat support for a solenoid valve consists of a sleeve-shaped support housing for accommodating a valve seat body, which is produced from a plastic and which has the contour of a hollow cylinder. The support housing has, on the periphery thereof, a plurality of small-surface recesses, which are directly radially inward and which are surrounded by the plastic of the valve seat body on all sides in order to establish an interlocking connection between the support housing and the valve seat body.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
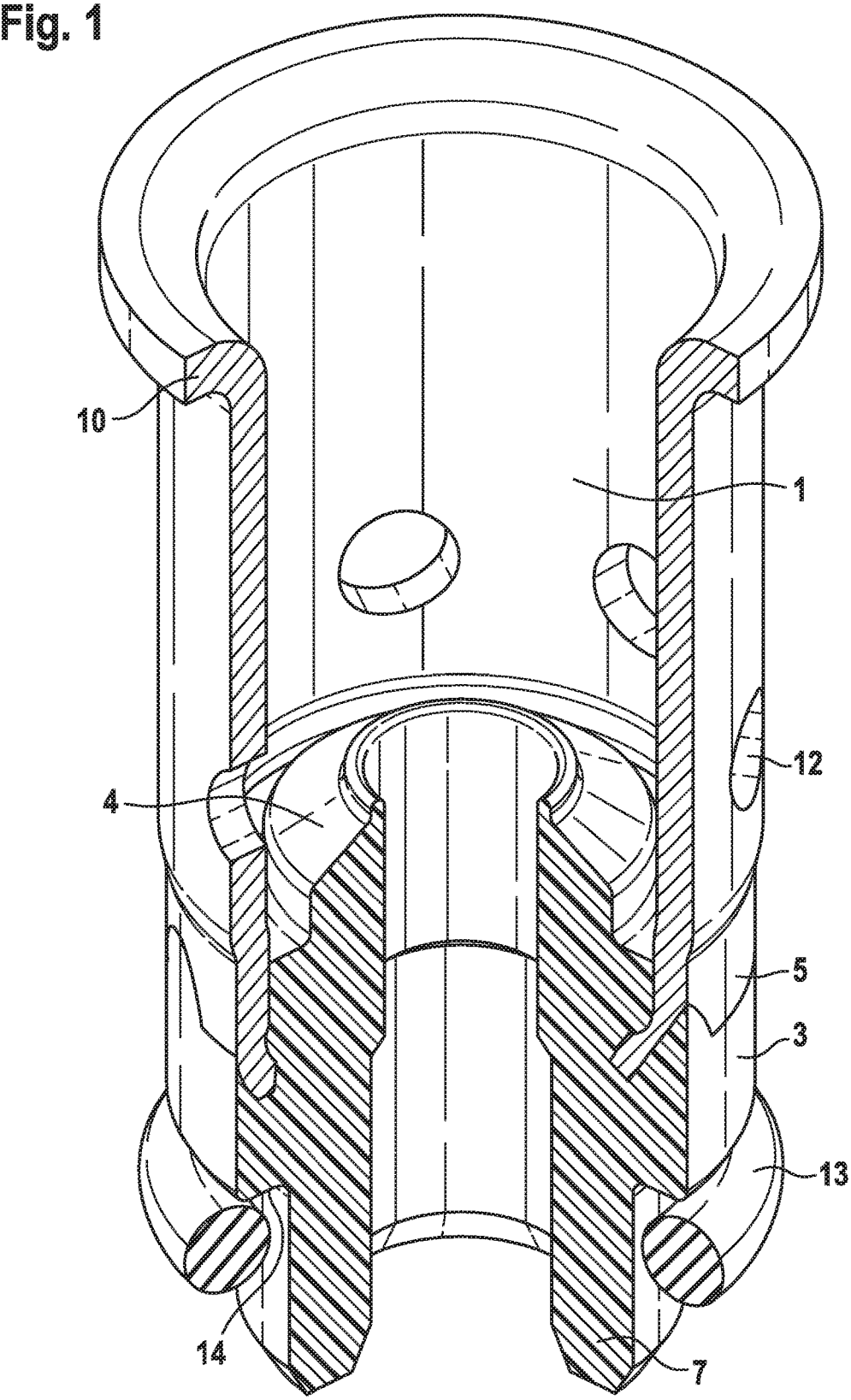
FIG. 1 is a perspective longitudinal sectional view of a suitable embodiment of the valve seat support.

FIG. 1 shows in a considerable enlargement the valve seat support according to the invention, consisting of a sleeve-like support housing 1 containing a valve seat body 3 which is made from a plastic and has the contour of a hollow cylinder.

FIG. 1 furthermore shows that, on its end region facing away from the valve seat 4, the valve seat body 3 has a cylindrical extension 7 protruding from the support housing 1, over which an elastic sealing ring 13 is pushed onto the cylindrical extension 7 as far as a shoulder 14. The sealing ring 13 ensures that, after mounting of the valve seat support in a valve housing (not shown), no gaseous or liquid pressurized medium can escape along the outer contour of the valve seat support into the valve housing.

Figure 2:
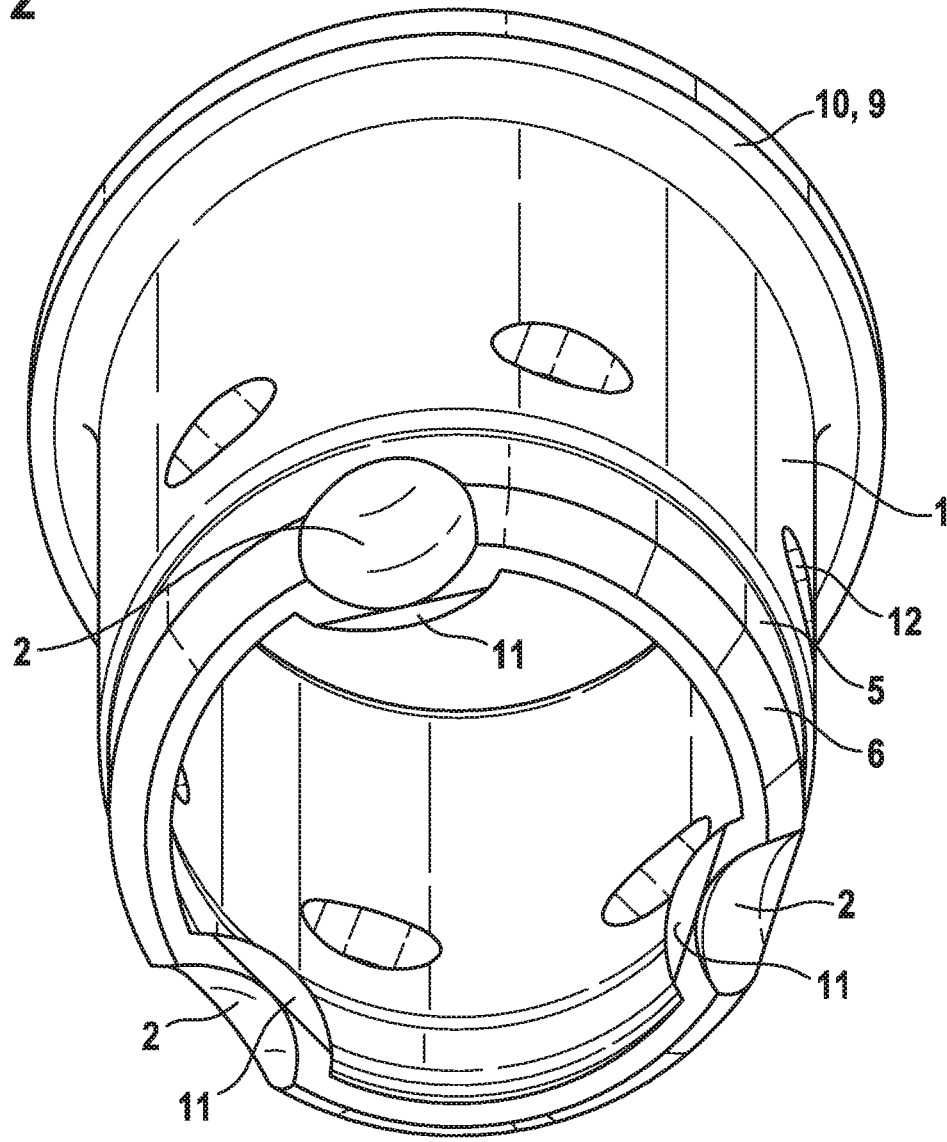
FIG. 2 is a perspective view of a chamfered end portion which, on the outside, is provided with three trough-shaped depressions evenly distributed over the periphery of the valve seat support and protruding into the valve seat support as small-surface radial protrusions.
Figure 3:
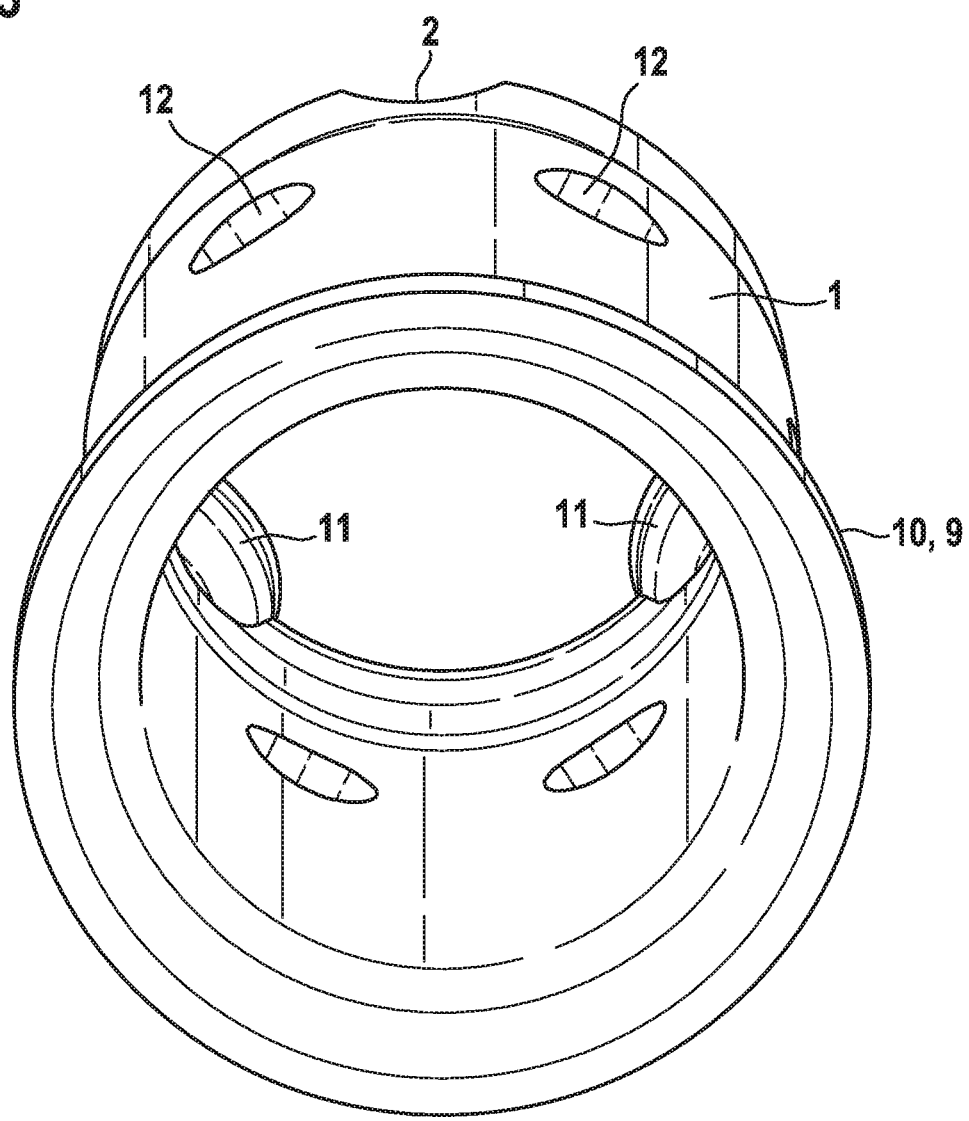
FIG. 3 is a perspective view of the valve seat support oriented in the opposite direction to FIG. 2, such that a flange-like collar curving radially towards the outside is clearly evident.

In order to achieve a secure fixing of the valve seat body 3 in the support housing 1 with minimum complexity, as FIGS. 2 and 3 show, on its periphery the support housing 1 has several small-surface depressions 2 directed radially inward and protruding inwardly on the support housing 1 as radial protrusions 11, which create an interlocking connection between the support housing 1 on the valve seat body 3 and which are surrounded by the plastic of the valve seat body 3 on all sides in the end state of the valve seat support as shown on FIG. 1.

As FIGS. 2 and 3 show, a plurality in this case at least three trough-shaped depressions 2 are provided on the support housing 1, evenly distributed over the periphery of the support housing 1. According to the depiction in FIG. 1, the depressions 2 are filled completely with the plastic of the valve seat body 3 so that, after the production of the valve seat support, the plastic terminates flush with the outer casing of the support housing 1.

For simplicity and for an interlocking fixing of the valve seat body 3 to the support housing 1, FIG. 2 illustrates in a top view the arrangement of the depressions 2 with the resulting protrusions 11 made directly on an end portion 5 of the support housing 1 which is provided with a hopper-shaped chamfer 6 interrupted by the depressions 2. The chamfer 6 and the depressions 2 are preferably produced in one working process by plastic deformation of the support housing 1 consisting of a thin plate.

Because of the use of thin plate, the sleeve contour of the support housing 1 shown in all figures is produced by a deep-drawing process in which the depressions 2, in order to form the protrusions 11 inside the support housing 1, are formed by means of an embossing die applied from the outside. Preferably, the depressions 2 are here formed in the shape of troughs, dishes or cups. Also, the casing of the support housing 1 comprises several passage openings 12, also produced by embossing or punching, for the passage of pressurized medium, at a distance from the depressions 2.

FIG. 3 shows in a perspective view the valve seat support in the opposite direction to FIG. 2, so that it shows a top view of the flange-like collar which curves radially towards the outside and is also produced in the deep-drawing process, and which is arranged at the sleeve end 9 opposite the chamfer 6. The collar 10 serves for compact fixing of the valve seat support in a valve housing (not shown) of a solenoid valve, the valve closing member of which either closes or opens the valve seat 4 of the valve seat body 3 depending on the electromagnetic excitation.

For production and interlocking fixing of the valve seat body 3 in the support housing 1, the initially liquid plastic is supplied to the support housing 1 via the hopper-shaped chamfer 6 provided on the sleeve-shaped support housing 1, for which the plastic is supplied by means of a plastic injection nozzle which may be immersible in the support housing 1.

The hollow cylindrical contour is formed and the valve seat body 3 is fixed both on the outside at the depressions 2 and on the inside at the protrusions 11 at the same time in one working process by injection-molding of the plastic in the region of the protrusions 11 and the depressions 2.

This allows economic production, suitable for automation, of the valve seat support, with the result of an absolutely safe and inseparable interlocking connection of the valve seat body 3 to the support housing 1 with simultaneous production of the valve seat body 3.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A valve seat support for a solenoid valve comprising:
   a valve seat body made of a plastic and having the contour of a hollow cylinder;
   a sleeve-shaped support housing for receiving the valve seat body;
   a plurality of small-surface depressions defined on a periphery of the support housing and directed radially inward;
   a plurality of radial protrusions protruding inwardly on the support housing;
   an interlocking connection between the depressions and the radial protrusions to connect the support housing and the valve seat body;
   wherein the interlocking connection are surrounded by the plastic of the valve seat body; and
   wherein the depressions are filled completely with the plastic of the valve seat body and terminate flush with an outer casing of the support housing.

2. The valve seat support of claim 1, wherein the depressions are distributed evenly over the periphery of the support housing.

3. The valve seat support of claim 1, wherein the depressions are formed in the shape of one of: troughs, dishes and cups.

4. The valve seat support of claim 3, wherein the support housing is formed by deep-drawing of thin plate in which the depressions are embossed by an embossing die applied from the outside.

5. The valve seat support of claim 1, wherein the depressions are defined an end portion which is formed on the support housing and having a hopper-shaped chamfer interrupted by the depressions.

6. The valve seat support of claim 5, wherein the hopper-shaped chamfered end portion and the depressions are formed by plastic deformation of the support housing.

7. The valve seat support of claim 5, wherein the support housing has a collar arranged on a sleeve end opposite the chamfer for fixing in a valve housing.

8. The valve seat support of claim 5, wherein plastic is supplied into and around the end portion via the hopper-shaped chamfer on the support housing to form the contour of the valve seat body.

9. The valve seat support of claim 5, wherein plastic is supplied into and around the end portion through a variably orientable plastic injection nozzle to form the valve seat body.

10. The valve seat support of claim 1, wherein the interlocking fixing of the valve seat body at the radial protrusions and depressions is achieved in one working process with the hollow cylindrical formation of the valve seat body.

11. The valve seat support of claim 10, wherein the interlocking fixing of the valve seat body is achieved by plastic injection molding.

* * * * *